US011180691B2

(12) United States Patent
Sodhi et al.

(10) Patent No.: US 11,180,691 B2
(45) Date of Patent: Nov. 23, 2021

(54) USE OF COMPOSITES HAVING COATING OF REACTION PRODUCT OF SILICATES AND POLYACRYLIC ACID

(71) Applicant: Baker Hughes, Houston, TX (US)

(72) Inventors: Thomas Sodhi, Houston, TX (US); D. V. Satyanarayana Gupta, The Woodlands, TX (US); John Howard Mayor, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 163 days.

(21) Appl. No.: 16/254,282

(22) Filed: Jan. 22, 2019

(65) Prior Publication Data
US 2020/0231866 A1 Jul. 23, 2020

(51) Int. Cl.
C09K 8/80 (2006.01)
C09K 8/66 (2006.01)
E21B 43/267 (2006.01)
C09K 8/57 (2006.01)
C09K 8/575 (2006.01)
C09K 8/68 (2006.01)

(52) U.S. Cl.
CPC .............. C09K 8/805 (2013.01); C09K 8/572 (2013.01); C09K 8/5753 (2013.01); C09K 8/66 (2013.01); C09K 8/68 (2013.01); E21B 43/267 (2013.01)

(58) Field of Classification Search
CPC ...... C09K 8/805; C09K 8/572; C09K 8/5753; C09K 8/66; C09K 8/68; E21B 43/267
See application file for complete search history.

(56) References Cited

U.S. PATENT DOCUMENTS

| | | | |
|---|---|---|---|
| 4,031,958 A | 6/1977 | Sandiford et al. | |
| 4,081,029 A | 3/1978 | Holm | |
| 4,154,894 A | 5/1979 | Bushey | |
| 4,432,798 A | 2/1984 | Helferich et al. | |
| 4,469,517 A | 9/1984 | Cooke, Jr. | |
| 4,585,064 A | 4/1986 | Graham et al. | |
| 4,622,425 A * | 11/1986 | Gagne ........................ | C08F 8/44 562/595 |
| 4,713,203 A | 12/1987 | Andrews | |
| 5,342,595 A | 8/1994 | Davidovits et al. | |
| 5,798,307 A | 8/1998 | Davidovits et al. | |
| 6,059,034 A | 5/2000 | Rickards et al. | |
| 6,330,916 B1 | 12/2001 | Rickards et al. | |
| 6,364,018 B1 | 4/2002 | Brannon et al. | |
| 6,742,590 B1 | 6/2004 | Nguyen | |
| 7,160,844 B2 | 1/2007 | Urbanek | |
| 7,931,087 B2 | 4/2011 | Gupta | |
| 9,562,188 B2 | 2/2017 | Monroe et al. | |
| 9,683,431 B2 | 6/2017 | Lant et al. | |
| 9,822,621 B2 | 11/2017 | Lant et al. | |
| 10,047,280 B2 | 8/2018 | Monroe et al. | |
| 10,472,943 B2 * | 11/2019 | Mahoney ................. | C09K 8/80 |
| 2003/0102128 A1 | 6/2003 | Dawson et al. | |
| 2005/0244641 A1 | 11/2005 | Vincent | |
| 2007/0023187 A1 | 2/2007 | Canova et al. | |
| 2007/0131145 A1 | 6/2007 | Biscan et al. | |
| 2009/0100766 A1 | 4/2009 | Gebhardt | |
| 2009/0105371 A1 * | 4/2009 | Luster-Teasley ......... | B09C 1/08 523/124 |
| 2010/0104873 A1 | 4/2010 | Wang et al. | |
| 2010/0113251 A1 | 5/2010 | San-Miguel et al. | |
| 2010/0203336 A1 | 8/2010 | Shiao et al. | |
| 2011/0048711 A1 * | 3/2011 | Lewis ................... | C09K 8/467 166/286 |
| 2011/0118155 A1 | 5/2011 | Pisklak et al. | |
| 2011/0159240 A1 | 6/2011 | Shiao et al. | |
| 2011/0160101 A1 | 6/2011 | Naderhoff et al. | |
| 2011/0297383 A1 | 12/2011 | Tanguay et al. | |
| 2012/0024026 A1 | 2/2012 | Varadachari | |
| 2012/0152153 A1 | 6/2012 | Gong et al. | |
| 2012/0156381 A1 | 6/2012 | Allouche et al. | |
| 2012/0157358 A1 | 6/2012 | Fang et al. | |
| 2013/0081812 A1 | 4/2013 | Green et al. | |
| 2013/0274153 A1 | 10/2013 | Urbanek | |
| 2014/0162911 A1 | 6/2014 | Monastiriotis et al. | |
| 2014/0338915 A1 * | 11/2014 | Ferm ....................... | C02F 5/10 166/307 |
| 2015/0083397 A1 | 3/2015 | Monroe et al. | |
| 2015/0114640 A1 | 4/2015 | Bestaoui-Spurr et al. | |
| 2015/0299561 A1 | 10/2015 | Monroe et al. | |
| 2016/0153274 A1 | 6/2016 | Hull et al. | |

(Continued)

FOREIGN PATENT DOCUMENTS

| | | | |
|---|---|---|---|
| CA | 2447928 A1 | 5/2005 | |
| CA | 2540415 A1 | 5/2005 | |

(Continued)

OTHER PUBLICATIONS

EP Search Report in EP 14859137.3, dated May 4, 2017 (8 pp.).

(Continued)

Primary Examiner — Crystal J Miller
(74) Attorney, Agent, or Firm — John Wilson Jones; Jones Delflache LLP

(57) ABSTRACT

The strength of a proppant or sand control particulate may be improved by coating the proppant to form a composite. The composite has enhanced compressive strength between about 34 to about 130 MPa and minimizes the spelling of fines at closure stresses in excess of 5,000 psi. Conductivity of fractures is further enhanced by forming a pack of the composites in the fracture.

26 Claims, No Drawings

(56) References Cited

U.S. PATENT DOCUMENTS

| | | | |
|---|---|---|---|
| 2017/0073576 A1 | 3/2017 | Bestaoui-Spurr et al. | |
| 2018/0002594 A1* | 1/2018 | Hu | C09K 8/665 |
| 2018/0086961 A1* | 3/2018 | Weaver | C09K 8/90 |
| 2019/0284468 A1* | 9/2019 | Mahoney | C09K 8/805 |
| 2020/0017760 A1 | 1/2020 | Goyal et al. | |
| 2020/0056083 A1* | 2/2020 | Khamatnurova | C09K 8/601 |

FOREIGN PATENT DOCUMENTS

| | | |
|---|---|---|
| CA | 2540429 A1 | 5/2005 |
| CA | 2475668 A1 | 1/2006 |
| CA | 2494051 A1 | 7/2006 |
| EP | 0595471 B1 | 6/1996 |
| EP | 3296278 A1 | 3/2018 |
| WO | 2010-041025 A1 | 4/2010 |
| WO | 2012055028 A1 | 5/2012 |
| WO | 2018164663 A1 | 9/2018 |

OTHER PUBLICATIONS

Abdullah MMA et al. "Mechanism and Chemical Reaction of Fly Ash Geopolymer Cement—A Review," Int. J. Pure Appl. Sci. Technol., 6(1), pp. 35-44 (2011).

International Search Report & Written Opinion in PCT/US2019/014575, dated Jan. 9, 2020.

Schubert, U., Chemistry and Fundamentals of the Sol-Gel Process, The Sol-Gel Handbook (2015).

Rohm Haas, "Acumer 4300", Mar. 2004, FC-458.

Amjad, Z., et al., "Effects of Thermal Stress on Silica-Silicate Deposit Control Agent Performance: Part 1-Silica Polymerization Inhibition," The Analyst, vol. 18, No. 4 (2011).

Ma, X., "Effect of a low-molecular-weight polyacrylic acid on the coagulation of kaolinite particles," International Journal of Mineral Processing 99 (2011) 17-20.

Burns, L.D., et al., "New Generation Silicate Gel System for Casing Repairs and Water Shutoff," SPE 113490 (2008).

* cited by examiner

USE OF COMPOSITES HAVING COATING OF REACTION PRODUCT OF SILICATES AND POLYACRYLIC ACID

TECHNICAL FIELD

The disclosure relates to a method of treating a subterranean formation with a composite having a proppant or sand control particulate core and a coating covering at least a portion of the proppant or sand control particulate core. The coating strengthens the core and enhances the crush resistance of the core. At elevated stress conditions, the amount of fines generated during treatments using the proppant or sand control particulate core is dramatically decreased by the presence of the coating.

BACKGROUND OF THE DISCLOSURE

Hydraulic fracturing is a common stimulation technique used to enhance production of hydrocarbon fluids from subterranean formations. In a typical hydraulic fracturing treatment, a treatment fluid containing a solid proppant is injected into the formation at a pressure sufficiently high to cause the formation to fracture or cause enlargement of natural fractures in the reservoir. The viscosity of the fracturing fluid containing the proppant is typically increased by the presence of a gelling agent such as a polymer, which may be uncrosslinked or crosslinked, and/or a viscoelastic surfactant. The proppant is deposited in the fracture, where it remains until after the treatment is completed. During the treatment, the proppant holds the fracture open and creates a porous and permeable bed. The bed enhances the ability of fluids to migrate from the formation to the wellbore. Since productivity is dependent on the ability of the fracture to conduct fluids from the formation to the wellbore, fracture conductivity is an important parameter in determining the degree of success of a hydraulic fracturing treatment.

Choice of proppant is often critical to the success of the stimulation operation. If proppant granules cannot withstand the reservoir closure stress imposed by the formation, the granules are compressed together in such a way that they crush, and small particles of reservoir "fines" are generated from the proppant and/or reservoir matrix. This often leads to significant proppant pack conductivity damage and associated reduction in fracture conductivity. In some cases, production of fines may be exacerbated during production/workover operations when a well is shut-in and then re-opened. This phenomenon is known as "stress cycling" and is believed to result from increased differential pressure and closure stress that occurs during fluid production following shut-in. Production of fines is highly undesirable since fines reduce reservoir permeability by plugging pore throats in the reservoir.

Production of formation hydrocarbon-containing fluids having entrained particulate solids is also a common problem. The source of these particulate solids may be unconsolidated material from the formation, proppant from a fracturing treatment and/or fines generated from crushed fracture proppant, as mentioned above. Production of solid proppant material is commonly known as "proppant flowback." In addition to causing increased wear on downhole and surface production equipment, the presence of particulate materials in production fluids often leads to significant expense and production downtime associated with removing these materials from wellbores and/or production equipment. Accumulation of these materials in a wellbore may also restrict or even prevent fluid production. In addition, loss of proppant due to proppant flowback may also reduce conductivity of a fracture pack.

Due to its low cost and availability, silica ($SiO_2$) sand is typically used as proppant in fracturing operations as well as the particulate in sand control operations. The quality of the properties of sand vary depending on its origin. For instance, white sand, from the northern great lake regions (primarily Minnesota and Wisconsin) is monocrystalline, made of single quartz crystals that offer superior strength properties compared to other sands. Brown sand, such as Brady sand from Texas, is polycrystalline; each grain being composed of multiple crystals bonded together. The existence of cleavage planes within each grain results in greater crush and reduced properties of the proppant (or sand control particulate). Typically, untreated sand is not capable of withstanding closure stresses in excess of 6,000 psi. Such restrictions limit sand for use as a proppant or sand control particulate in shallow reservoirs. Stronger proppants and sand control particulates having closure stresses in excess of 6,000 psi are needed for use in reservoirs.

Resin-coated sand is known to generate fewer fines up to closure stresses of about 8,000 psi. Fracture conductivity would be enhanced in deeper completions by use of proppants and sand control particulates stronger than resin-coated sands. While ceramic materials have been known to provide better conductivity for formation closures of over 12,000 psi, such materials are expensive. Alternatives have therefore been sought for enhancing conductivity in formations having closure stresses up to 12,000 psi while minimizing spalling of formation fines.

It should be understood that the above-described discussion is provided for illustrative purposes only and is not intended to limit the scope or subject matter of the claims set forth herein. Thus, none of the claims should be limited by the above discussion or construed to address, include or exclude each or any of the above-cited features or disadvantages merely because of the mention thereof herein.

SUMMARY OF THE DISCLOSURE

In an embodiment, a proppant or sand control particulate is provided which is a composite comprising a core and coating. At least a portion of the surface of the core is coated with the reaction product of sodium silicate and a low molecular weight polyacrylic acid; the reaction of the sodium silicate and the polyacrylic acid being catalyzed in the presence of calcium chloride or zinc chloride.

In another embodiment, another proppant or sand control particulate is provided which is a composite comprising a core and a coating over at least a portion of the core. The core has free hydroxyl groups on its surface. The coating is a hardened reaction product between the free hydroxyl groups and an oxide of a metal. The metal may be a transition metal such as silica, zirconia, titanium, antimony, vanadium, zinc, copper, niobium, chromium, molybdenum, tungsten, manganese, cobalt, iron, nickel, or palladium or a mixture thereof. The compressive strength of the composite is between from about 34 to about 130.0 MPA.

In another embodiment, a method of treating a subterranean formation penetrated by a well is provided wherein any of the above-described proppant or sand control particulates are introduced into a well.

In another embodiment, a method of hydraulic fracturing a subterranean formation penetrated by a well is provided wherein any of the above-described composites are pumped into the well a fracture to create or enlarge a fracture within the formation wherein the fracture is held open by the composite.

In another embodiment, a method of increasing the conductivity of a fracture in a subterranean formation is provided wherein a fracture in the formation is created or enlarged upon pumping of a fracturing treatment fluid into the well which contains any of the above-described composites and wherein a pack of the particulates of the composite is form within the fracture.

In another embodiment, a method of reducing the amount of fines generated during a hydraulic fracturing operation or a sand control operation on a subterranean formation is provided wherein any of the composites described in the above paragraphs are pumped into the well and wherein the amount of fines generated during the hydraulic fracturing or sand control operation is less than the amount of fines generated during an identical hydraulic fracturing or sand control operation differing only by the pumping of the pristine proppant or sand control particulate into the well.

In another embodiment, a sand control method for a wellbore is provided wherein a slurry containing any of the above-described composites is introduced into a well penetrating a subterranean formation. The composites are placed adjacent to the subterranean formation to form a fluid-permeable pack capable of reducing or substantially preventing the passage of formation particles from the subterranean formation into the wellbore while allowing passage of formation fluids from the subterranean formation into the wellbore. The composite exhibits crush resistance under conditions greater than 8,000 psi closure.

In another embodiment, a process of making a proppant or sand control composite comprising a core and a coating over at least a portion of the surface of the core is provided. In this embodiment, sodium silicate and a low molecular weight polyacrylic acid crosslinking agent and either calcium chloride or zinc chloride are applied onto the surface of the core. A hardened reaction product forms on the surface of the core which contains either calcium silicate or zinc silicate.

In another embodiment, a process of preparing a surface modified proppant or sand control composite is provided wherein the composite has a core and a coating on at least a portion of the surface of the core. In this method, at least a portion of the surface of the core is etched, thereby forming free hydroxyl groups on the surface of the core. A sol comprising one or more oxides of silica, zirconia, titanium, antimony or vanadium or a mixture thereof is then applied onto at least a portion of the etched surface. A hardened reaction product is formed on the surface from the oxide(s) and the free hydroxyl groups.

In another embodiment, a process of preparing a surface modified proppant or sand control particulate of a composite having a core and a coating on at least a portion of the surface of the core is provided. In this process, a transition metal oxide and a sol comprising silica or sodium silicate are applied onto at least a portion of the surface of the core. A reaction product is formed between the silica or sodium silicate and the transition metal oxide on the surface of the core. A second transition metal oxide is then applied onto at least a portion of the surface of the core. A complex of the first transition metal oxide and the second transition metal oxide is formed. The resulting produced is then dried. A hardened coating is thereby formed on the surface of the core.

DETAILED DESCRIPTION

Characteristics and advantages of the present disclosure and additional features and benefits will be readily apparent to those skilled in the art upon consideration of the following detailed description of exemplary embodiments of the present disclosure.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance. By way of example, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

Further, reference herein to components and aspects in a singular tense or to the suffix(es) does not necessarily limit the present disclosure to only one such component or aspect, but should be interpreted generally to mean one or more, as may be suitable and desirable in each particular instance.

All ranges disclosed herein are inclusive of the endpoints. A numerical range having a lower endpoint and an upper endpoint shall further encompass any number and any range falling within the lower endpoint and the upper endpoint. For example, every range of values in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

All references are incorporated herein by reference.

The disclosure relates to composites having a core and a hardened coating at least partially covering the surface of the core. The phrase "at least partially covering the proppant or sand control particulate core" may be defined as the majority (over 50 wt. %) of the proppant or sand control particulates having at least some coating thereon even if 100 wt. % of the proppant or sand control particulates are not completely covered. Alternatively, "at least partially covering the proppant or sand control particulate cores" may be defined as at least the majority (over 50 wt. %) of the proppant or sand control particulates are completely covered with the coating. In another non-limiting embodiment, both of these definitions may be used simultaneously.

In a preferred embodiment, the composite comprises a core which is surrounded completely by the hardened coating. In the embodiment, the core is the substrate which is encapsulated by the hardened coating.

The core of the composite is strengthened by the coating on its surface. Thus, the composite as defined herein demonstrates increased strength compared to the pristine proppant or sand control particulate. (The term "pristine" as used herein refers to the uncoated proppant or sand control particulate. When referencing a pristine proppant or sand control particulate, it is understood that the pristine proppant or sand control particulate is the same as the core of the composite.)

The enhanced strength of the proppant or sand control particulate is evidenced by the increased compressive strength of the composite when compared to the pristine proppant or sand control particulate.

The increased strength of the composite makes the composite particularly effective in reducing the generation of fines. Fines are typically generated at the fracture-face to proppant pack interface as in situ closure stresses acting upon the fracture cause failure of the proppant, the formation rock, or both. Such stresses cause particulates of proppant to be compressed together such that fines are generated from the proppant pack and/or reservoir matrix. Since the composites are capable of withstanding high closure stresses applied on the proppant pack, the generation of fines is reduced.

The composites are thermally stable. As such, they do not decompose or come apart at high temperatures, even up to at least 800° C. In one non-limiting embodiment the high temperature range may be from about 40° F. to about 600° F. (about 4° C. to about 316° C.).

The composite is compatible with well treatment fluids. When used in aqueous carrier fluids, such as fracturing fluids or aqueous slurries (such as those used in sand control operations), the pH of the fluid is stabilized. Thus, the pH of the fluid is not substantially affected by the presence of the composite and remains neutral to slightly basic. Typically, the pH of the fluid containing the composite is between from about 4 to about 12.

In an embodiment, a pH stabilizer, such as aluminum trichloride or a weak organic acid or anhydride (such as acetic acid or acetic acid anhydride), may be introduced onto the surface of the core to enhance hardening of the mixture. In some instance, a strong acid, such as hydrochloric acid, may be used in place of the organic acid. Dehydroxylated kaolin may further be used as an enhancer with aluminum trichloride. The pH stabilizer may be a component of the reaction product.

In an embodiment, the core of the composite has free hydroxyl groups on its surface.

In an embodiment, the hardened coating may be formed on the surface of the core by coating at least a portion of the surface of the core with one or more of the transition metal oxides. In a preferred embodiment, the metal of the oxides may be a transition metal such as silica, zirconia, titanium, antimony, vanadium, zinc, copper, niobium, chromium, molybdenum, tungsten, manganese, cobalt, iron, nickel, or palladium or a mixture thereof.

When the core is sand, it may be desirable to enhance the presence of the free hydroxyl groups on the surface of the core by scrubbing or etching the surface prior to the introduction of the oxide. For instance, it may be desirable to etch the surface of the core by mildly scrubbing the surface of the core with an alkaline hydroxide, such as sodium hydroxide, calcium hydroxide or potassium hydroxide. This enhances the generation of the hydroxyl groups on the surface of the sand.

Typically, the metal oxide reacts with the free hydroxyl groups on the surface of the core and condensation between the one or more metal oxides and the hydroxyl groups occurs. The metal oxide(s) typically first produce dimers and trimers which form the building blocks for further polymerization. The polymerization may be conducted at room temperature or initiated under mild heat causing the components to polycondense or polymerize.

A suitable temperature range to initiate the polymerization of the coating may range from about 0° C. to about 300° C.; in another non-restrictive embodiment from about 20° C. to about 300° C.; alternatively, from about 60° C. to about 200° C. A suitable temperature range to further complete or cure the polymerization of the coating may range from about 20° C. to about 300° C.; alternatively, from about 25° to about 200° C. The resulting product may then be removed from the vessel to ensure complete hardening of the mixture onto the core. In some instances, it may be desirable to subject the coated core to higher heating conditions to effectuate a complete cure.

Typically, the amount of transition metal oxide(s) in the hardened composite is between from about 5 to about 15 weight percent, preferably from about 6 to about 10 weight percent.

Typically, the transition metal oxide(s) is introduced onto the core in a liquid sol, the slurry containing the divided metal oxides as fine colloids. The sol may contain an alkali hydroxide or oxide, such as sodium hydroxide, calcium hydroxide or potassium hydroxide which increases the amount of free hydroxyl groups on the surface of the core. The transition metal oxide is reactive with the free hydroxyl groups. The reaction between the transition metal oxide(s) and the free hydroxyl groups may be a sol-gel exothermic reaction.

In an alternative embodiment, silica or sodium silicate may be applied onto the core after or before the transition metal oxide(s) is applied. In an embodiment, the silica or sodium silicate and the transition metal oxide(s) may be applied to the core as a mixture.

In an embodiment, the silica or sodium silicate is applied onto the core in a liquid carrier. The liquid carrier may contain the transition metal oxide(s). Typically, a sol containing the silica and/or silicate (and optionally the transition metal oxide) is applied onto the core.

The sol containing the silica and/or silicate may further include an alkali hydroxide or alkali oxide, preferably sodium, calcium or potassium hydroxide or oxide. The mole ratio of alkali metal hydroxide or alkali metal oxide (e.g. $Na_2O$ or $K_2O$) to $SiO_2$ in forming the sol ranges from about 1:1 to about 6:1; alternatively, from about 1:1 to about 7:1. Suitable ratios include, but are not necessarily limited to, about 3.2:1 and about 5.4:1; either of which may be suitable alternative lower or upper thresholds of a range.

The transition metal oxide is believed to first react with the free hydroxyl groups (and/or the alkali oxide or hydroxide in the sol) and the resulting product then reacts with the silica and/or silicate to generate the polymer. The overall reaction is typically exothermic and hardening of the coating occurs during the exothermic reaction.

In a preferred embodiment, the surface of the core is etched as described herein prior to introduction of the silica or sodium silicate containing sol.

The molar ratio of silica or silicate and transition metal oxide in the coating is typically from about 1:1 independently to about 30:1; alternatively, from about 6:1.

In an embodiment, the silica or sodium silicate may first be applied onto the core to provide a uniform wetness on the surface of the core. The transition metal oxide (and the optional pH stabilizer) may then be introduced onto the wet core and the coating hardened. The coating may then be fully cured.

In another preferred embodiment, the composite is prepared by a sol-gel exothermic reaction wherein the proppant core is first combined with a slurry comprising (i) sodium silicate and/or silica; (ii) the transition metal oxide; and (iii) alkali hydroxide and the slurry then applied onto the core. The slurry is hardened onto the core while adding onto the core dry aluminum trichloride (optionally with dehydroxylated kaolin). Water may then be sprayed onto the core during hardening of the slurry. The composite with hardened coating may then be fully cured. The exothermic reaction between dry or powdered aluminum trichloride and water assists the curing process and provides a more uniform coating on the surface of the core.

Additional transition metal oxide may alternatively be applied onto the core after or during the initial polymerization of the transition metal oxide. Where a sol is used in combination with the transition metal oxide, the additional transition metal oxide may be applied onto the core during the formation of the reaction product between the silica or silicate and the transition metal oxide as described in the paragraphs above. The additional transition metal oxide may be the same oxide as that initially introduced onto the surface of the core with the silica or sodium silicate containing sol. The metal oxide complex which is formed constitutes the oxide initially introduced as well as the second metal oxide. The product may then be dried and optionally cured.

When aluminum trichloride, weak organic acid or anhydride or hydrochloric acid is used, it may be introduced during the coating process as a liquid (preferably as a mist), solid or liquid and solid together onto the surface of the core. In one embodiment, the aluminum trichloride (optionally with dehydroxylated kaolin), weak organic acid or anhydride or hydrochloric acid is applied during the hardening of the transition metal oxide or during the hardening of the sol with the transition metal oxide or during hardening of the transition metal oxide and the free hydroxyl groups. The pH stabilizer may further be applied onto the surface concurrently with the transition metal oxide(s) (and optionally the sol) or may be introduced onto the core as well as during the hardening of the transition metal oxide. If needed, the resulting composite may be put into an oven to finish the polymerization process.

Alternatively, when a sol is introduced onto the core, the aluminum trichloride (and optional dehydroxylated kaolin), weak organic acid/anhydride or hydrochloric acid may be a component of the sol. Thus, the aluminum trichloride, weak organic acid/anhydride or hydrochloric acid may be applied onto the core either (i) simultaneously with the transition metal oxide; (ii) simultaneously with a sol containing a silica or silicate; (iii) as a component of the sol containing the transition metal and/or silica or silicate. In an embodiment, the pH stabilizer may be sprayed onto the surface of the core after or while the transition metal oxide, and optional silica or silicate, are being applied onto the core. In an embodiment, the pH stabilizer may be applied onto the core during hardening.

Typically, the amount of aluminum trichloride, weak organic acid or anhydride or hydrochloric acid, when present, in the composite is an amount sufficient to provide a pH from about 6 to about 9 to an aqueous fluid (such as a fracturing fluid or a sand control slurry) containing the composite. For example, the weight ratio of the aluminum trichloride, weak organic acid or anhydride or hydrochloric acid to the transition metal oxide in the composite may be from about 1:4, preferably from about 1.5:3.5.

In some cases, it may be desirable to pre-heat the sol and/or transition metal oxide prior to applying the same onto the core. In other instances, it may be desirable to heat the core prior to applying the sol and/or transition metal oxide and the optional pH stabilizer onto the surface of the core. In such cases, the temperature of the core may be between 0 to about 300° C. when any or all of the components of the coating are applied. In a preferred embodiment, the coating process includes pre-heating the core in a mixer, such as a rotary mixer, and then adding the transition metal oxide(s), optional silica or silicate and pH stabilizer while exposing them to a heat gun or other source to trigger polymerization. The core may be pre-heated prior to or subsequent to etching of the surface.

In some instances, it is desirable to pre-heat the mixing vessel prior to introducing the core and/or coating components into the mixer. When desired, the mixing vessel may be pre-heated to a temperature between from about 20 to about 250° C.

In an embodiment, the hardened silicate formed on the surface of the core may result by introducing a coating of sodium silicate and a low molecular weight polyacrylic acid to at least a portion of the core. The coating further includes calcium chloride or zinc chloride. The calcium chloride or zinc chloride forms calcium silicate or zinc silicate, respectively. Hardening of the coating on the core results from the reaction between the silicate and polyacrylic acid. Without being bound to any theory, it is believed the calcium and/or zinc cations, being less soluble in water than the sodium cation, replace the sodium cation on the silicate. Replacement of the sodium cation by the calcium or zinc cation creates a gel; the gel then being crosslinked with the polyacrylic acid. During the process, the replacement of the cations provides better adhesion for the polyacrylic acid in the gelled state. Further, the calcium chloride or zinc chloride is believed to catalyze the reaction between the silicate and polyacrylic acid.

In an embodiment, when the core is sand, the surface of the core may be etched prior to introducing the sodium silicate, polyacrylic acid and/or the chloride to the surface of the core. Typically, etching can be performed by mildly scrubbing the surface of the core with an alkaline hydroxide, such as sodium hydroxide, calcium hydroxide or potassium hydroxide. Such scrubbing generates hydroxyl groups on the surface of the core.

Typically, the weight ratio between the sodium silicate to the polyacrylic acid is from about 1:1 to about 5:1, preferably from about 2:1 to about 3:1. The weight ratio between the calcium chloride and/or zinc chloride to the polyacrylic acid is from about 1:1000 to about 5:100, preferably from about 5:1000 to about 1:100. The weight ratio between the calcium chloride and/or zinc chloride to the sodium silicate is from about 0.5:100 to about 5:100, preferably from about 1:100 to about 1.5:100.

Further, the formation of the reaction product of sodium silicate and the polyacrylic acid occurs without having to pre-heat the core (or the reactants). The reaction product is further formed without the use of a pH stabilizing agent, such as aluminum trichloride.

Further, a temperature less than 160° F., typically less than 150° F., is needed to cure the reaction product.

The polyacrylic acid is water-soluble and is preferably derived from repeated subunits of (i) monomers of acrylic acid or its derivatives or (ii) two (or more) monomeric species, wherein one monomer is acrylic acid or one of its derivatives (copolymer). Reference to the polyacrylic acid herein further means both the acid and salt form. The polyacrylic acid is preferably a copolymer of acrylic acid and maleic acid, and/or their salts. A water-soluble acrylic polymer may be defined as water-soluble when it forms a solution in water containing at least 10 grams of acrylic polymer per liter of water at a temperature of 25° C. and a pressure of 1 bar. The acrylic polymer may further contain phosphate, phosphonate, phosphino, sulfate, and/or sulfonate groups.

In a preferred embodiment, the polyacrylic acid has a weight average molecular weight (Mw) of approximately 1,000 to approximately 4,000, preferably from about 1,500 to 2,500 and more preferably from about 1,800 to about 2,300.

A preferred polyacrylic acid is Acumer 4300 an acrylic acid maleic acid copolymer of Mw about 2,000, a product of Rohm and Haas.

Prior to finalizing curing, hydroxyl groups on the composite that were not neutralized during the reactions referenced herein may be neutralized by washing the composite with boric acid, a borate salt or a borate ester. A borate ion releasing compound may also be used. The amount of the boric acid, borate salt or borate ester or released borate can be sufficient to completely crosslink the available hydroxyl groups and can be monitored by placing the coated composite in water and confirming the pH of the water does not change. While such crosslinking enhances the strength of the coating, it further stabilizes the pH of a fluid containing the composite by preventing the leaching of hydroxide ions into the fluid. In addition to boric acid, suitable species include alkali metal borates such as sodium diborate, potassium tetraborate, sodium tetraborate (borax), pentaborates and the like and alkaline and zinc metal borates. Borate ion releasing compounds include boric oxide (such as selected from $H_3BO_3$ and $B_2O_3$), and polymeric borate compounds such as borate esters, trimethyl borate for example and polyborate anions including the triborate(1-), tetraborate(2-) and pentaborate(1-) anions.

The composites of the disclosure further include a filler that actively participate with the components of the reaction. Such fillers include, but are not necessarily limited to, fly ash and wollastonite and the like. The ratio of filler to reaction components (acidic solution and binder) can vary between about 1 independently to about 80 wt. % of the total mass of solid material used in the reaction; alternatively, between about 5 independently to about 70 wt. %.

By dramatically increasing the strength of the proppant or sand control particulate, use of the proppant or sand control particulate (in the form of the composite) may be extended to formation closure stresses of at least about 5000 psi (34 MPa), alternatively at least to about 6,000 psi (41 MPa), alternatively at least to about 8,000 (55 MPa) and in another non-limiting embodiment to about 10,000 psi (69 MPa), alternatively at least to about 12,000 psi (83 MPa), alternatively at least to about 14,000 psi (97 MPa) and even up to 18,900 psi (130 MPa). In one non-limiting embodiment, the compressive strength ranges from about 35 to about 130 MPa, alternatively from about 50 to about 100 MPa, and in another non-restrictive embodiment from about 60 to about 83 MPa. At such closure stresses, the composite will generate less fines than a pristine proppant or sand control particulate. Thus, the spalling of fines is minimized at using the composite as proppant or sand control particulate.

The apparent density of the composite may be less than the apparent density of the core. Apparent density as referenced herein may be determined using the American Petroleum Institute standard API-RP-19C.

In one non-limiting embodiment, the core may have an apparent density greater than or equal to 2.5 and alternatively greater than or equal to 2.65 g/cm$^3$. For example, sand has an apparent density of approximately 2.65 g/cm$^3$. The apparent density of a composite having a core of sand is typically between about 2.3 to about 2.63 g/cm$^3$, alternatively from between about 2.55 to about 2.6 g/cm$^3$; in another non-restrictive version from about 2 to about 2.61 g/cm$^3$.

In another non-limiting embodiment, the proppant or sand control particulate core may be a relatively lightweight or substantially neutrally buoyant particulate material or a mixture thereof. Such materials may be chipped, ground, crushed, or otherwise processed By "relatively lightweight" it is meant that the solid particulate has an apparent specific gravity (ASG) which is less than or equal to 2.45, including those ultra lightweight materials having an ASG less than or equal to 2.25, alternatively less than or equal to 2.0, in a different non-limiting embodiment less than or equal to 1.75, in another non-limiting embodiment less than or equal to 1.5, and in another non-restrictive version less than or equal to 1.25 and often less than or equal to 1.05.

Suitable relatively lightweight solid particulates are those disclosed in U.S. Pat. Nos. 6,364,018; 6,330,916; and 6,059,034, all of which are herein incorporated by reference.

Naturally occurring solid particulates include, but are not necessarily limited to, nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles may be formed by crushing, grinding, cutting, chipping, and the like.

Other solid particulates for use herein include beads or pellets of nylon, polystyrene, polystyrene divinyl benzene or polyethylene terephthalate such as those set forth in U.S. Pat. No. 7,931,087, also incorporated herein by reference.

Exemplary cores may include white sand, brown sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof.

Examples of ceramics include, but are not necessarily limited to, oxide-based ceramics, nitride-based ceramics, carbide-based ceramics, boride-based ceramics, silicide-based ceramics, or a combination thereof. In a non-limiting embodiment, the oxide-based ceramic may include, but is not necessarily limited to, silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic may contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include, but are not necessarily limited to, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant or sand control particulate core include, but are not limited to, Arizona sand, Wisconsin sand, Badger sand, Brady sand, and Ottawa sand. In a non-limiting embodiment, the solid particulate may be made of a mineral such as bauxite which is sintered to obtain a hard material. In another non-restrictive embodiment, the bauxite or sintered bauxite has a relatively high permeability such as the bauxite material disclosed in U.S. Pat. No. 4,713,203, the content of which is incorporated by reference herein in its entirety.

Where the coating is applied to relatively lightweight proppant or sand control particulates, such as a proppant or sand control particulate having an ASG greater than or equal to 1.75, the strength of the proppant or sand control particulate is enhanced while low apparent density is maintained.

The coating will also increase the temperature tolerance of the polymer proppant or sand control particulate core. By "tolerance" is meant that the composite maintains its structural integrity, that is, it does not break down into smaller fragments up to at least this temperature, or when it contacts chemicals up to at least this temperature.

The amount of the coating on the proppant or sand control particulate core ranges from about 0.5 wt % to about 30 wt % or higher; alternatively from about 0.5 wt % to about 15 wt %; and alternatively, from about 1 wt. % to about 8 wt. % by weight of the core. Suitable amounts include, but are not necessarily limited to, about 2 wt %, about 4 wt %, about 5 wt %, about 8 wt %, and about 15 wt %, any of which may serve as a suitable lower or upper threshold of a proportion range.

In an embodiment, the composite withstands a closure stress up to about 8,000 psi when the coating ranges from about 5 to about 9 wt. percent of the weight of the core, up to about 10,000 psi when the coating ranges from about 1 to about 15 wt. percent of the weight of the core and alternatively, up to about 12,000 psi when the coating ranges from about 1 to about 20 wt. percent of the weight of the core.

The thickness of the coating may range from about 2 independently to about 120 microns, alternatively from about 50 independently to about 80 microns, over a relatively wide range, in another non-limiting embodiment. Thickness of the coating has been shown to significantly increase the strength and crush resistance of the proppant or sand particulate core. As stated herein, the coating protects the particle from crushing, helps resist embedment, and prevents the liberation of fines.

Exemplary cores may include sand, including white sand and brown sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof.

Examples of ceramics include, but are not necessarily limited to, oxide-based ceramics, nitride-based ceramics, carbide-based ceramics, boride-based ceramics, silicide-based ceramics, or a combination thereof. In a non-limiting embodiment, the oxide-based ceramic may include, but is not necessarily limited to, silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic may contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include, but are not necessarily limited to, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant or sand control particulate core include, but are not limited to, Arizona sand, Wisconsin sand, Badger sand, Brady sand, and Ottawa sand. In a non-limiting embodiment, the solid particulate may be made of a mineral such as bauxite which is sintered to obtain a hard material. In another non-restrictive embodiment, the bauxite or sintered bauxite has a relatively high permeability such as the bauxite material disclosed in U.S. Pat. No. 4,713,203, the content of which is incorporated by reference herein in its entirety.

In a preferred embodiment, mixing vessel, into which the coating is applied onto the proppant or sand control particulate core, is a bowl-shaped mixer having a curved bottom. The bowl is at a 45 degree angle from the point of introduction of the components which form the composite. Such reactors enhance the formation of a homogeneous coating onto the surface of the proppant or sand control particulate core.

The size of the composite may be any size suitable for use in a fracturing treatment of a subterranean formation or a sand control operation. The optimal size of the composite may be dependent on in situ closure stress. In an embodiment, the composites may have a particle size of less than about 1 micron, less than about 0.5 micron, or less than about 0.1 micron. In an embodiment, the composites may have a particle size of about 10 nanometers to about 500 nanometers, about 20 nanometers to about 100 nanometers or about 20 nanometers to about 40 nanometers. As used herein, "size" refers to the largest linear dimension, e.g., a diameter in a spherical particle.

Suitable shapes for the composites include, but are not necessarily limited to, beaded, cubic, bar-shaped, cylindrical, rod-shaped or a mixture thereof. Shapes of the proppant or sand control particulates may vary, but in one embodiment may be utilized in shapes having maximum length-based aspect ratio values, in one exemplary embodiment having a maximum length-based aspect ratio of less than or equal to about 25, alternatively of less than or equal to about 20, alternatively of less than or equal to about 7, and further alternatively of less than or equal to about 5. In yet another exemplary embodiment, shapes of such composites may have maximum length-based aspect ratio values of from about 1 to about 25, alternatively from about 1 to about 20, alternatively from about 1 to about 7, and further alternatively from about 1 to about 5. In yet another exemplary embodiment, such composites may be utilized in which the average maximum length-based aspect ratio of particles present in a sample or mixture containing only such particles ranges from about 1 to about 25, alternatively from about 1 to about 20, alternatively from about 2 to about 15, alternatively from about 2 to about 9, alternatively from about 4 to about 8, alternatively from about 5 to about 7, and further alternatively is about 7.

In one embodiment, the composite used may have a beaded shape or spherical shape and a size of from about 4 mesh to about 300 mesh, alternatively from about 8 mesh to about 140 mesh, alternatively from about 12 mesh to about 60 mesh, alternatively from about 16 mesh to about 40 mesh, and alternatively about 20/40 mesh. Thus, in one embodiment, the composite may range in size from about 1 or 2 mm to about 0.1 mm; alternatively, their size will be from about 0.2 mm to about 0.8 mm, alternatively from about 0.4 mm to about 0.6 mm, and alternatively about 0.6 mm. However, sizes greater than about 2 mm and less than about 0.1 mm are possible as well.

The composite is preferably a sphere having a Krumbein sphericity (API-RP-19C) of at least about 0.5, alternatively at least about 0.6; and a roundness (Sloss Chart) of at least about 0.4, alternatively at least about 0.6.

In an embodiment, the surface of the composite may be modified to render the composite hydrophobic, hydrophilic or oleophobic. In an embodiment, a ratio of formation surfaces that are water wet relative to formation surfaces that are oil wet may correspond to a proportion of the hydrophilic composites to hydrophobic composites in produced fluid to provide information about the wettability of the formation surfaces In an exemplary embodiment, the composite may be rendered hydrophobic by modifying the surface of the composites with an aliphatic group, an oil or a fat. Surface modified means that the aliphatic groups are bonded to the surface of the composite or physically associated with the surface. In an embodiment, the aliphatic groups are bonded to the surface of the composite via a functional group, for example a carboxylate group.

For example, the composite may be modified with a $C_6$-$C_{30}$ aliphatic group including $C_{10}$-$C_{28}$ as well as $C_{12}$-$C_{25}$ aliphatic group. As used herein, "aliphatic group" means a saturated or unsaturated linear or branched hydrocarbon group. A hydrocarbon group refers broadly to a substituent comprising carbon and hydrogen, optionally with 1 to 3 heteroatoms, for example, oxygen, nitrogen, halogen, silicon, sulfur, or a combination thereof. An aliphatic group may be an alkyl, alkenyl, or alkynyl group, for example.

In another embodiment, the hydrophobic composite may be prepared by modifying the surface of the composite with a fatty acid. The fatty acid can be saturated or unsaturated. A mixture of different fatty acids can be used. Exemplary fatty acids include caprylic acid, capric acid, lauric acid, myristic acid, palmitic acid, stearic acid, behenic acid, lignoceric acid, cerotic acid, myristoleic acid, palmitoleic acid, sapienic acid, oleic acid, elaidic acid, vaccenic acid, linoleic acid, arachidonic acid, erucic acid, or a combination comprising at least one of the foregoing.

An exemplary process for preparing the hydrophobic composite may include dissolving the modifying agent having an aliphatic tail and a head in a solvent. The tail may contain the $C_6$-$C_{30}$ or $C_{12}$-$C_{25}$ aliphatic group. The head may contain a functional group such as a carboxylic acid group. The composite may then be introduced to the solution containing the modifying agent. The composite may in a powder form or, alternatively, may be first dissolved or dispersed in a solvent to form a solution or dispersion. After the modifying agent is combined with the composite in the presence of a solvent, the mixture may be mixed for a sufficient amount of time such that the head of the modifying agent bonded or attached to the surface of the composite.

In like manner, the composites may be rendered hydrophilic by reacting the surface of the composite with an alcohol.

In some embodiment, a modifying agent may be used which imparts both hydrophobic and oleophobic properties to the composite. For instance, the modifying agent may be an organo-silicon containing material or a fluorinated alkyl.

In an embodiment, the organo-silicon containing material may be a silane, polysiloxane or a polysilazane.

Examples of organo-silicon containing materials are those having the formula $R^1_{4-x}SiA_x$ or $(R^1_3Si)_yB$ as well as organo(poly)siloxanes and organo(poly)silazanes containing units of the formula:

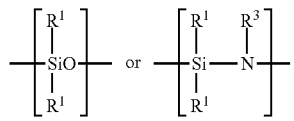

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5_2SiO_2$ where $R^5$ is a halogen such as a chloro or fluoro substituent.

In an embodiment, the organo-silicon containing compound may be an organo(poly)siloxane or organo(poly)silazane of a number average molecular weight of at least 400, usually between 1000 and 5,000,000.

The substituent A in $R^1_{4-x}SiA_x$ may be hydrogen, a halogen such as chloride, OH, $OR^2$ or

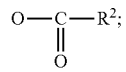

wherein B in the above structural formula may be $NR^3_{3-y}$, $R^2$ a hydrocarbon or substituted hydrocarbon radical containing from 1 to 12, typically 1 to 4 carbon atoms. $R^3$ is hydrogen or has the same meaning as $R^1$, x is 1, 2 or 3, y is 1 or 2.

In an embodiment, $R^1$ may be a fluoro-substituted hydrocarbon.

Preferred as fluoro-substituted hydrocarbons are those of the structure:

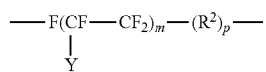

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

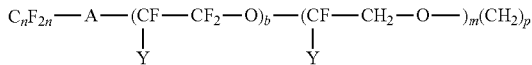

where A is an oxygen radical or a chemical bond; n is 1 to 6, Y is F or $C_nF_{2n+1}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxy-acetylacetonate (acac) polydimethylsiloxanes. Exemplary surface modifying treatment agents include tantalum halide-perfluoroalkoxysiloxane, such as $TaCl_5$:PFOSi; tantalum alkoxy-perfluoroalkoxysilane; tantalum alkoxyacetylacetonate-perfluoroalkoxysiloxane, like $Ta(EtO)_4acac$:PFOSi; tantalum alkoxy-alkylsilylhalide; tantalum halide-polyalkylsiloxane, like $TaCl_5$:PDMS; niobium alkoxide-perfluoroalkoxysiloxane, such as $Nb(EtO)_5$:PFOSi and $Ta(EtO)_5$:PFOSi; titanium alkoxide-perfluoroalkoxysiloxane, like $Ti(n-BuO)_4$:PFOSi; zirconium alkoxide-perfluoroalkoxysiloxane; lanthanum alkoxide-perfluoroalkoxysilane, like $La(iPrO)_3$:PFOSi; tungsten chloride-perfluoroalkoxysiloxane, like $WCl_6$:PFOSi; tantalum alkoxide-polyalkylsiloxane, like $Ta(EtO)_5$:PDMS; and tantalum alkoxyacetylacetonate-polyalkylsiloxane, like $Ta(EtO)_4acac$:PDMS.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as carboxyl, like of the structure —(C=O)—OR; and R is hydrogen, perfluoroalkyl, alkyl or substituted alkyl containing from 1 to 50 carbon atoms.

Examples of perfluoroalkyl groups are those of the structure F—$(CFY—CF_2)_m$ where Y is F or $C_nF_{2n+1}$; m is 4 to 20 and n is 1 to 6.

Examples of perfluoroalkylene ether groups are those of the structure:

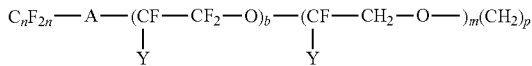

where A is an oxygen radical or a chemical bond; n is 1 to 6, Y is F or $C_nF_{2n+1}$; b is 2 to 20, m is 0 to 6, and p is 0 to 18, preferably 2 to 4 and more preferably 2.

Preferred fluorinated materials are esters of perfluorinated alcohols such as the alcohols of the structure F—$(CFY—CF_2)_m$—$CH_2$—$CH_2$—OH where Y is F or $C_nF_{2n+1}$; m is 4 to 20 and n is 1 to 6.

Further preferred as fluorinated hydrocarbons are perfluorinated hydrocarbons of the structure $R_f$—$(CH_2)_p$—X where $R_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

Further preferred as fluorinated hydrocarbons are perfluorinated hydrocarbons of the structure $R_f$—$(CH_2)_p$—Z where $R_f$ and p are as defined above, preferably $R_f$ is a perfluoroalkylene ether group such as those described above, and p is from 2 to 4, and Z is a phosphorus acid group. Examples of phosphorus acid groups are:

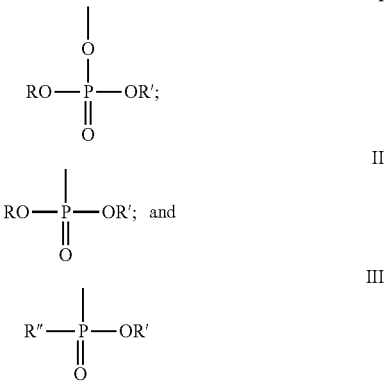

where R" is a hydrocarbon or substituted hydrocarbon radical having up to 200, such as 1 to 30 and 6 to 20 carbons, R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

In another embodiment, the surface modifying treatment agent imparts at least one of the following properties to the composite: magnetism, isolator, wettability alteration or electrical conductivity. As such, the composite may be used to enhance recovery of oil and/or gas from the well. For instance, the composite may be at least partially coated with a magnetic polymer which exhibits superparamagnetic properties. In another embodiment, the composites may be used as an isolator (packer) in chemical packers.

The composites may be employed with carrier or treatment fluids in order to facilitate placement of the composite to a desired location within the formation. The composites may be introduced into the wellbore at any concentration deemed suitable or effective for the downhole conditions to be encountered. The composite may be introduced as part of a treating fluid into a well down wellbore tubulars (e.g., tubing, workstring, casing, drill pipe) or down coiled tubing, for example at concentrations of about 0.25 to about 15 pounds per gallon of carrier fluid.

Any carrier fluid suitable for transporting the composite into a well and/or subterranean formation fracture in communication therewith may be employed including, but not limited to, carrier fluids including a completion or workover brine, salt water or brine, fresh water, potassium chloride solution, a saturated sodium chloride solution, liquid hydrocarbons or a gas or liquefied gas such as nitrogen or carbon dioxide.

The fluids may be gelled, non-gelled or have a reduced or lighter gelling requirement as compared to carrier fluids employed with conventional fracture treatment/sand control methods. The latter may be referred to as "weakly gelled", i.e., having minimum sufficient polymer, thickening agent, such as a viscosifier, or friction reducer to achieve friction reduction when pumped downhole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. The non-gelled carrier fluid may contain no polymer or viscosifier.

The use of a non-gelled carrier fluid eliminates a source of potential proppant pack and/or formation damage and enhancement of well productivity. Elimination of the need to formulate a complex suspension gel may further mean a reduction in tubing friction pressures, particularly in coiled tubing and in the amount of on-location mixing equipment and/or mixing time requirements, as well as reduced costs.

The carrier or fracturing fluid may further contain one or more conventional additives to the well service industry such as a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid, buffer, solvent or a mixture thereof and other well treatment additives known in the art. The addition of such additives to the carrier fluids minimizes the need for additional pumps required to add such materials on the fly.

Additives, such as fillers, plasticizers, cure accelerators and retarders, and rheology modifiers may be used in the coating compositions described herein in order to achieve desired economical, physical, and chemical properties of the proppant or sand control particulate coating during the mixing of the chemical components, forming and cure of the particles, and the field performance of the coatings on the proppant or sand control particulates.

Compatible fillers include, but are not necessarily limited to, waste materials such as silica sand, Kevlar fibers, fly ash, sludges, slags, waste paper, rice husks, saw dust, and the like, volcanic aggregates, such as expanded perlite, pumice, scoria, obsidian, and the like, minerals, such as diatomaceous earth, mica, borosilicates, clays, metal oxides, metal fluorides, and the like, plant and animal remains, such as sea shells, coral, hemp fibers, and the like, manufactured fillers, such as silica, mineral fibers and mats, chopped or woven fiberglass, metal wools, turnings, shavings, wollastonite, nanoclays, carbon nanotubes, carbon fibers and nanofibers, graphene oxide, or graphite. In some non-limiting instances these fillers may be part of the reaction.

The composites have particular applicability in fracturing operations of low permeability subterranean reservoirs such as those comprised primarily of coal, limestone, dolomite, shale, siltstone, diatomite, etc., known to be susceptible to fines generation due to their friable nature.

When used in hydraulic fracturing, the composites combined with the fluid are injected into the formation at pressures sufficiently high to cause the formation or enlargement of fractures, or to otherwise expose the composites to formation closure stress. In an embodiment, the composites form a pack having voids in the fracture. Any closure of the formation between the composites that occurs within the fracture will be held open and remain conductive by the composites bracing the fracture walls apart.

Where the composites are closely packed or multi-layered, the conductivity goes through the porosity defined and created by the packing of the composites and forming the proppant pack. Conductivity may also be provided from between the fracture face and the proppant pack.

In an embodiment, the composites may be used to form a partial monolayer. In such instances, the high conductivity of the created fractures is attributable to the ability of produced fluids to flow around the widely spaced composites instead of being confined to the relatively small interstitial spaces evidenced in the packed bed. The diameter of the composite is substantially similar to the width of the created fracture to be created.

The composite may withstand a closure stress of at least about 1000 psi (6.9 MPa), alternatively of at least about 5000 psi (34 MPa) or greater, up to 10,000 psi (69 MPa), even without the coating. However, with the coatings described herein, compression strength may range up to about 12,000 psi (83 MPa), and even up to 130 MPa (18,900 psi). In one non-limiting embodiment, the compressive strength ranges from about 35 to about 130 MPa, alternatively from about 50 to about 100 MPa, and in another non-restrictive embodiment from about 60 to about 83 MPa. However, it will be understood with benefit of this disclosure that these are just optional guidelines.

Since the composites withstand high reservoir closure stresses, they prevent the full closure of the facture, thereby enhancing fracture conductivity. The composite exhibits enhanced conductivity of fractures compared to a pristine proppant.

In an embodiment, the proppant matrix or pack has a conductivity equal to or greater than 800 millidarcy feet (mdft), 300 mdft, 90 mdft, 20 mdft and 10 mdft at a pressure of about 1,000 psi, 2000 psi, 4000 psi, 6000 psi and 8,000 psi, respectively.

The strength of the composite further minimizes or prevents embedment of the composite into the rock at high stresses (typically in excess of 10,000 psi). Embedment of proppant into the formation decreases the width of the proppant pack. Embedment reduces proppant pack conductivity as the embedded proppant plugs pore throats of the pack with formation fines spalled from the rock displaced into the proppant pack. The reduction in fine generation thus enhances fracture conductivity.

In a preferred embodiment, the composites are deformable. By "deformable" it is meant that the composites of the pack substantially yield upon application of a threshold level to point to point stress. The in situ deformation of the composites form multi-planar structures or networks and thus serve as a cushion to prevent grain-to-grain contact and absorb stress. Such cushioning prevents the composite from shattering or breaking due to stress (including stress induced by stress cycling). The deformability of the composites attributes to less fines being generated, and conductivity being maintained. Reduction in fines generation further permits the extension of the closure stress range in which the proppant pack may be used.

Fracture conductivity may be further increased by the placement of the composite to create a partial monolayer to support the fracture. Fractures containing partial monolayers exhibit vacant areas around and between the composites which thereby increases the relative conductivity of the propped fracture. The monolayer is created when the propped fracture has a width that is equal to one particle diameter with no remaining voids into which additional particles may be placed.

While the packing of a complete monolayer of composite is 2 pounds per square foot, the packing of a partial monolayer of the composite is typically between from about 0.02 to about 0.8 lbs. per sq. ft for the composite with ASG between 1.1 and 1.5. Such packing causes an increase in porosity of the fracture. The resulting partial monolayer of composite exhibits greater conductivity than that evidenced with the complete monolayer.

In one non-limiting embodiment, the composites may be useful for flow back control, particularly in the embodiment where the coating may be deformable—this may help the proppant stay in place. These materials may be used together with non-coated and pristine proppant particulates. It is expected that flowing fluid back through the composites where the amount of the proppants flowed back (through the composite) is less than the amount of otherwise pristine proppants flowed back. In one non-limiting version, the amount of proppants flowed back is reduced from about 10 wt % or more less proppant produced to 100 wt %; alternatively, the amount of proppants flowed back is reduced from about 20 wt % or more less proppant produced to 80 wt %.

In one non-limiting embodiment, the flexibility of the coating may be improved by including in the coating a hydratable polymer such as carboxyalkyl celluloses, like carboxymethyl cellulose and/or galactomannan gums, such as underivatized guar and/or guar derivatives and the like. These polymers are included in the structure of the coating and thus not available to be solubilized in the fracturing fluid.

Further, the composites may be used in a sand control method (such as gravel packing) for a wellbore penetrating a subterranean formation and may be introduced into the wellbore in a slurry with a carrier fluid. A screen assembly such as is known in the art may be placed or otherwise disposed within the wellbore so that at least a portion of the screen assembly is disposed adjacent the subterranean formation. A slurry including the composite in the carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the sand control method may use the composite in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The composites may be employed to simplify hydraulic fracturing treatments or sand control treatments performed through coil tubing, by greatly reducing fluid suspension property requirements. When placed downhole, the composite exhibits a much reduced propensity to settle (as compared to conventional proppant or sand control particulates), particularly in highly deviated or horizontal wellbore sections.

In this regard, the composites may be advantageously employed in any deviated well having an angle of deviation of between about 0° and about 90° with respect to the vertical. However, in one embodiment, the composite may be advantageously employed in horizontal wells, or in deviated wells having an angle with respect to the vertical of between about 30° and about 90°, alternatively between about 75° and about 90°.

The composite may further be utilized as particulate/proppant material at more severe or demanding downhole conditions (e.g., at higher downhole temperatures and/or under higher downhole conditions of closure stress) than the conditions under which conventional particulates are suitably employed. The downhole temperatures may be greater than or equal to about 300° F.

The composites defined herein further exhibit a variety of features, some of which have already been mentioned. For instance, the composites may reach their final mechanical properties by chemical reaction at low temperature (<300° C.).

The bonding type of the coating on the core may include a mixture of ionic, covalent and Van Der Waals bonding, with the ionic and covalent dominating.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Crush resistant tests were performed according to the procedure detailed in API-RP-19C. The proppant materials were crushed at 6, 7, 8, 10 and 12 kpsi. 41.15 g of sieved, split proppant were loaded in the crush cell and crushed at a given stress level using an MTS hydraulic press (Model 561-324-01, with a capacity of 550 kpsi). The stress was increase at a rate of 2,000 psi/min. Once the desired stress was reached, the sample was maintained at stress for 2 min before release. The sample was then removed from the cell, weighed and sieved for 10 min (m) using the stack of sieves. The particles that fell below the lowest mesh size of the stack were weighed and calculated as fines ("$m_{pan}$"). For example, for 20/40 mesh sand, any particles that fell below 40 mesh were considered fines. The weight % crush mass was determined using equation (2):

$$\text{wt. \%} = \frac{m_{pan}}{m} \times 100 \quad (2)$$

where:

$m'_{pan}$ is the mass of fines generated in the test, in g; and
m is the mass of proppant recovered from the cell, expressed in g.

Examples 1-7. These examples demonstrate sol-gel reaction of the sodium silicate surface with a metal oxide. The surface of 40/70 sand (having a crush resistance rating, ISO-13503-2/API-RP-19C, of 6 k) was impregnated with a sodium silicate solution; existing cracks on the sand surface were occupied by the sodium silicate. Two different concentrations of sodium silicates were used having a molar ratio of [$Na_2O$]/[$SiO_2$] of 3.2 and 4.5. Either calcium oxide or zinc oxide was used to transform sodium silicate to calcium silicate or zinc silicate, respectively; these materials being much less soluble than sodium silicate. Impregnation occurred in a rotary mixer. Aluminum trichloride was optionally added as a powder to decrease pH. The reactor was heated using a heat gun for two minutes. The resulting product was then removed from the reactor and placed in a metal pan. The metal pan was placed in an oven and cured. Table VIII and IX show the results obtained when using calcium oxide and zinc oxide, respectively, with the sodium silicate solution. The baseline is a control where the sand was not subjected to any processing. The pH refers to that of an aqueous fluid (pH 7.0) to which was added the composite:

TABLE VIII

| | Comp.<br>(Baseline) | 1 | 2 | 3 | 4 |
|---|---|---|---|---|---|
| 40/70 Sand (g) | | 300 | 300 | 300 | 300 |
| 3.2 Sodium Silicate Solution (mL) | | 60 | 37.63 | | |
| 4.5 Sodium Silicate Solution (mL) | | | | 37.63 | 37.63 |
| Calcium Oxide (g) | | 30 | 30 | 6.62 | 6.62 |
| Aluminum chloride (g) | | | 1 | 1 | 2 |
| Water (mL) | | | 12.42 | 14.80 | 20.80 |
| pH | | 11.82 | 11.70 | 11.63 | 10.15 |
| Fines (wt. %) @ 8,000 psi | 20.90 | 14.20 | 14.30 | 14.30 | 12.95 |

TABLE IX

| Component | Comp.<br>(Baseline) | 5 | 6 | 7 |
|---|---|---|---|---|
| 40/70 Sand (g) | | 300 | 300 | 300 |
| 4.5 Sodium Silicate Solution (mL) | | | 60.00 | 30.75 |
| Aluminum Chloride (g) | | | | 7.00 |
| Water (mL) | | | | 30.75 |
| ZnO (g) | | 30.00 | 30.00 | 20.50 |
| pH | | 10.34 | 10.06 | 6.65 |
| Fines (wt. %) @ 8,000 psi | 20.9 | 13.3 | 15.9 | 14.74 |

The Tables show the pH of the aqueous fluid was much lower when zinc oxide was used with the 4.5 sodium silicate solution, versus calcium oxide. Adding aluminum trichloride brought the pH to a neutral range. The fines generated at 8,000 psi also decreased after coating the sand.

Examples 8-10. These examples demonstrate reaction of a sodium silicate surface with a low molecular weight polypolyacrylic acid and calcium chloride. The polyacrylic acid was obtained as Acumer™ 4300 from Rohm and Haas. About 300 g of 40/70 mesh U.S. sand (having a crush resistance rating, ISO-13503-2/API-RP-19C, of 6K) (not pre-heated) was added to a reactor and was then coated with the sodium silicate solution (the sodium silicate having a molar ratio of $Na_2O/SiO_2$ of 3.2). A spatula was used to thoroughly impregnate the sand. The low molecular weight polyacrylic acid (LMW PAA) diluted in water to 60% was then added to the moist sand, and a spatula was used to homogenize the sand. A 15 vol. % $CaCl_2$) solution was added to the wet sand. In Examples 8 and 10, a 0.1 M HCl and 1.0 M HCl, respectively, was also added. The reactor was allowed to spin for 17 minutes at 600 rpm as a heat source was applied. The coated sand was then removed from the reactor and placed into a metal pan which was heated in an oven for 40 minutes at 266° F. The composites were then subjected to closure stresses of 8,000 psi and 12,000 psi. The results are set forth in Table X. The comparative example is the baseline (control wherein the sand was not subjected to any processing). The pH refers to that of an aqueous fluid (approximately 7.0) to which was added the composite.

TABLE X

| Component | Comp.<br>Baseline | 8 | 9 | 10 |
|---|---|---|---|---|
| US Silica 40/70 Sand (g) | 300 | 300 | 300 | 300 |
| 3.2 Sodium Silicate Solution (mL) | | 36.6 | 36.6 | 36.6 |
| Calcium Chloride 15% (g) | | | 4 | 4 |
| LMW PAA 60% (mL) | | 18 | 18 | 18 |
| pH | | 10.28 | | |
| Fines (wt. %) @ 8,000 psi | 35.88 | 9.09 | 10.87 | 10.98 |
| Fines (wt. %) @ 12,000 psi | 46.1 | 15.49 | 16.99 | 20.89 |

Table X illustrates calcium chloride increases the reaction rate between the sodium silicate and LMW PAA. This is illustrated by Example 9 which shows that while the pH decreased slightly, the amount of fines at 8,000 psi decrease to slightly above 10%. Adding calcium chloride help carry the reaction further and decrease the pH as well.

Example 11. Example 11 also demonstrates reaction of a sodium silicate surface with a low molecular weight polyacrylic acid and calcium chloride using the same polyacrylic acid as in Examples 8-10. About 300 g of 40/70 mesh Delmon sand (having a crush resistance rating, ISO-13503-2/API-RP-19C, of 5K) (not pre-heated) was added to a reactor and was then coated with a 36.6 mL of the sodium silicate solution (the sodium silicate having a molar ratio of $Na_2O/SiO_2$ of 3.2). A 30 vol. % $CaCl_2$ solution (36.6 mL) was added over one minute and the product was wet product was then heated for about 6 minutes. The low molecular weight polyacrylic acid (LMW PAA) diluted in water to 30% (18 mL) was then added. A spatula was used to homogenize the sand. The pH of the water in contact of the particles being raised to 10.18. The reactor was heated for 2 minutes and then heated in an oven for 40 minutes at 150° F. The resulting composite was then subjected to a closure stress of 8,000 psi. The fines % was determined to be 4.09. (The baseline of the fines at 7,000 psi was 20.6% and at 8,000 psi was 37.40.)

Example 12. Example 11 also demonstrates reaction of a sodium silicate surface with a low molecular weight polyacrylic acid and calcium chloride using the same polyacrylic acid as in Examples 8-11. About 300 g of the sand of Example 11 (not pre-heated) was added to a reactor and pre-treated with the 30 vol. % $CaCl_2$ solution (12.2 mL). About 18.3 mL of the sodium silicate solution of Example 11 and the polyacrylic acid (18.3 mL) was then added to the resulting product. The product was then heated for about 13 minutes. A temperature of 212° F. was reached in the reactor. The product was not subjected to curing. The resulting composite was then subjected to a closure stress of 8,000 psi. The fines % was determined to be 16.0.

Examples 13-15. About 300 g of silica sand (having free hydroxyl groups on its surface) of 30/50 mesh (and a crush resistance rating, API-RP-19C, of 4 k) was added to a reactor, without pre-heating. While rotating the reactor, a slurry comprised of sodium silicate ($Na_2O/SiO_2$ of 3.2), water, zinc oxide and dehydroxylated kaolin was added to the reactor and the slurry was evenly spread on the sand particles using a spatula. The surface of the silica sand was etched prior to the addition of the slurry. Aluminum chloride was then added as a powder, and water was sprayed onto the surface of the particles while continuing rotating the reactor. The reactor was heated using a heat gun. The resulting composite was then removed from the reactor and placed in a glass container. The composite was then washed with a 0.5M boric acid solution for 10 minutes with light agitation in a 120° F. water bath. The sample was then placed into a metal pan and placed in an oven for 40 minutes at 150° F. to finalize the curing process. The results are shown in Table XI where Example 13 was not washed in the boric acid and the pH refers to that of an aqueous fluid (pH 7.0) to which was added the composite and a temperature of 150° F. maintained for 3 hours. Table XI shows that the 0.5 M and 1.0 M boric acid wash aided in controlling the pH change. The higher the concentration, the more neutral the pH (the pH becomes more neutral with the increasing boric acid concentration).

TABLE XI

| | | | |
|---|---|---|---|
| Sodium Silicate Solution (g) | 36.60 | 36.60 | 36.60 |
| Sodium Hydroxide (g) | 13.27 | 13.27 | 13.27 |
| Water (g) | 15 | 15 | 15 |
| Dehydroxylated kaolin, g | 14.8 | 14.8 | 14.8 |
| Aluminum trichloride (g) | 7.98 | 7.98 | 7.98 |
| Water added at the end of process(g) | 13.30 | 13.30 | 13.30 |
| Zinc Oxide <5 micron (g) | 14.8 | 14.80 | 14.80 |
| Boric Acid | | 0.5 M | 1.0 M |
| Fine (wt. %) at 8,000 psi | 7.99 | 8.06 | 12.04 |
| Curing time | 40 min | 40 min | 40 min |
| Curing temp | 150° F. | 150° F. | 150° F. |
| pH | 6.87 | 8.24 | 7.33 |
| pH after 3 hr@150 F. | 8.99 | 8.25 | 7.86 |

It will be appreciated that the descriptions above with respect to particular embodiments above are not intended to limit the invention in any way, but which are simply to further highlight or illustrate the invention. It is further understood that the invention is not limited to the exact details of procedures, operation, exact materials, or embodiments shown and described, as modifications and equivalents will be apparent to one skilled in the art. Accordingly, the invention is therefore to be limited only by the spirit and scope of the appended claims. Further, the specification is to be regarded in an illustrative rather than a restrictive sense. For example, specific combinations of proppant or sand control particulates, coatings, reactants to form the coatings and/or cores, reaction conditions to form coatings on the proppants, hydraulic fracturing method steps, and the like, falling within the claimed parameters, but not specifically identified or tried in a particular method, are anticipated to be within the scope of this invention.

The present invention may in one non-limiting embodiment comprise, alternatively consist or in a different non-restrictive version consist essentially of the elements disclosed.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

Embodiment 1. A proppant or sand control particulate comprising a composite comprising a core wherein at least a portion of the surface of the core is coated with a reaction product of sodium silicate and a low molecular weight polyacrylic acid catalyzed in the presence of calcium chloride or zinc chloride.

Embodiment 2. The proppant or sand control particulate of embodiment 1, wherein the weight average molecular of the polyacrylic acid is from about 1,000 to about 4,000.

Embodiment 3. The proppant or sand control particulate of embodiment 2, wherein the weight average molecular of the polyacrylic acid is from about 1,500 to about 2,500.

Embodiment 4. The proppant or sand control particulate of embodiment 3, wherein the weight average molecular of the polyacrylic acid is from about 1,800 to about 2,300.

Embodiment 5. The proppant or sand control particulate of any of embodiments 1 to 4, wherein the polyacrylic acid is a copolymer of acrylic acid and maleic acid and/or the salts thereof.

Embodiment 6. The proppant or sand control particulate of any of embodiments 1 to 5, wherein the surface of the core is etched to provide free hydroxyl groups.

Embodiment 7. The proppant or sand control particulate of embodiment 6, wherein the free hydroxyl groups are further crosslinked.

Embodiment 8. The proppant or sand control particulate of embodiment 7, wherein the free hydroxyl groups are crosslinked with a boric acid, salt or ester thereof or a borate releasing compound.

Embodiment 9. The proppant or sand control particulate of any of embodiments 1 to 8, wherein the compressive strength of the composite is between from about 34 to about 130.0 MPA.

Embodiment 10. The proppant or sand control particulate of any of embodiments 1 to 9, wherein the reaction product coated onto at least a portion of the core is calcium silicate.

Embodiment 11. The proppant or sand control particulate of any of embodiments 1 to 10, wherein the weight ratio of the sodium silicate to low molecular weight polyacrylic acid is from about 1:1 to about 5:1.

Embodiment 12. The proppant or sand control particulate of any of embodiments 1 to 9, wherein the weight ratio of the calcium chloride or zinc chloride to sodium silicate is from about 0.5:100 to about 5:100.

Embodiment 13. A proppant or sand control particulate comprising a hardened composite of (i) a core having free hydroxyl groups on its surface and (ii) a coating on at least a portion of the surface of the core, the coating comprising a hardened reaction product between the free hydroxyl groups and an oxide of a transition metal selected from the group consisting of silica, zirconia, titanium, antimony, vanadium, zinc, copper, niobium, chromium, molybdenum, tungsten, manganese, cobalt, iron, nickel, and palladium and mixtures thereof and further wherein the compressive strength of the composite is between from about 34 to about 130.0 MPA.

Embodiment 14. The proppant or sand control particulate of any of embodiments 1 to 13, wherein the core is selected from the group consisting of sand, ceramic beads, glass beads, bauxite grains, sintered bauxite, sized calcium carbonate, walnut shell fragments, aluminum pellets, nylon pellets, nut shells, gravel, resinous particles, alumina, minerals, polymeric particles, and combinations thereof.

Embodiment 15. The method of any of embodiments 1 to 14, wherein the apparent density of the core is less than 2.65 g/cc.

Embodiment 16. The method of any of embodiments 1 to 14, wherein the apparent density of the core is greater than or equal to 2.65 g/cc.

Embodiment 17. The proppant or sand control particulate of embodiment 16, wherein the core is sand.

Embodiment 18. The proppant or sand control particulate of embodiment 17, wherein the sand is brown sand.

Embodiment 19. The proppant or sand control particulate of any of embodiments 1 to 18, wherein the coating on the surface of the core further comprises a strengthening agent selected from the group consisting of Kevlar fibers, fly ash, sludges, slags, waste paper, rice husks, saw dust, volcanic aggregates, minerals, plant and animal remains, mineral fibers, chopped or woven fiberglass, metal wools, turnings, shavings, wollastonite, nanoclays, carbon nanotubes, carbon fibers, graphene oxide and graphite and mixtures thereof.

Embodiment 20. The proppant or sand control particulate of any of embodiments 1 to 19, wherein the coating on the surface of the core further comprises a magnetic, conductive or piezoelectric additive.

Embodiment 21. The proppant or sand control particulate of any of embodiments 1 to 19, wherein the coating on the surface of the core is further modified with a surface modifying treatment agent.

Embodiment 22. The proppant or sand control particulate of embodiment 21, wherein the surface of the composite is hydrophobic.

Embodiment 23. The proppant or sand control particulate of embodiment 21, wherein the surface of the composite is oleophobic.

Embodiment 24. The proppant or sand control particulate of any of embodiments 11 to 23, wherein the oxide is a binary, ternary or quaternary metal oxide or a mixture thereof.

Embodiment 25. The proppant or sand control particulate of any of embodiments 11 to 23, wherein the metal of the oxide is zinc or calcium.

Embodiment 26. A method of treating a subterranean formation penetrated by a well comprising introducing into the well the composite of any of embodiments 1 to 25.

Embodiment 27. A method of hydraulic fracturing a subterranean formation penetrated by a well comprising pumping into the well the composite of any of embodiments 1 to 25 and creating or enlarging a fracture within the subterranean formation.

Embodiment 28. A method of increasing the conductivity of a fracture in a subterranean formation comprising the steps of (a) providing a fracturing treatment fluid comprising the composite of any of embodiments 1 to 25; (b) enlarging or creating a fracture in the subterranean formation having particulates of the composite in the fracture; and (c) forming a pack of the composites in the fracture Embodiment 29. The method of embodiment 28, wherein the proppant pack has a conductivity equal to or greater than 20 mdft at a pressure of about 8,000 psi.

Embodiment 30. The method of embodiment 28, wherein the proppant pack has a conductivity equal to or greater than 10 mdft at a pressure of about 10,000 psi.

Embodiment 31. A method of reducing the amount of fines generated during a hydraulic fracturing operation or a sand control operation on a subterranean formation, the method comprising pumping a proppant or sand control particulate comprising the composite of any of embodiments 1 to 25 in the subterranean formation wherein the amount of fines generated during the hydraulic fracturing or sand control operation is less than the amount of fines generated during an identical hydraulic fracturing or sand control operation differing only by the pumping of the pristine proppant or sand control particulate into the well.

Embodiment 32. The method of any of embodiments 26 to 31, wherein the composite withstands a closure stress up to about 10,000 psi when the coating ranges from about 1 to about 15 wt. percent of the weight of the core.

Embodiment 33. The method of embodiment 32, wherein the composite withstands a closure stress up to about 12,000 psi when the coating ranges from about 3 to about 20 wt. percent of the weight of the core.

Embodiment 34. A sand control method for a wellbore penetrating a subterranean formation, comprising (a) introducing into the wellbore a slurry of the composite of any of embodiments 1 to 25 and a carrier fluid; (b) placing the composite adjacent the subterranean formation to form a fluid-permeable pack capable of reducing or substantially preventing the passage of formation particles from the subterranean formation into the wellbore while allowing passage of formation fluids from the subterranean formation into the wellbore and wherein the composite exhibits crush resistance under conditions greater than 8,000 psi closure Embodiment 35. A method of making a proppant or sand control composite comprising a core and a coating on at least a portion of the surface of the core, the method comprising applying sodium silicate and a low molecular weight polyacrylic acid crosslinking agent and either calcium chloride or zinc chloride onto the surface of the core and forming a hardened reaction product therefrom on the surface of the core.

Embodiment 36. The method of embodiment 35, wherein the sodium silicate is first reacted with the calcium chloride or zinc chloride to form a gel of calcium silicate or zinc silicate and the low molecular weight polyacrylic acid is then reacted with the gel.

Embodiment 37. The method of embodiment 35 or 36, wherein at least a portion of the surface of the core is etched prior to the addition of the sodium silicate, low molecular weight polyacrylic acid crosslinking agent and calcium chloride or zinc chloride onto the surface of the core.

Embodiment 38. The method of embodiment 37, wherein free hydroxyl groups are further crosslinked.

Embodiment 39. The method of embodiment 38, wherein the free hydroxyl groups are crosslinked with a boric acid, salt or ester thereof or a borate releasing compound.

Embodiment 40. The method of any of embodiments 35 to 39, wherein the hardened reaction product contains calcium silicate.

Embodiment 41. A method of preparing a surface modified proppant or sand control composite having a core and a coating on at least a portion of the surface of the core, the method comprising (a) etching at least a portion of the surface of the core and forming free hydroxyl groups on the surface of the core; (b) applying onto at least a portion of the etched surface a sol comprising one or more oxides of silica, zirconia, titanium, antimony or vanadium or a mixture thereof; and (c) forming a hardened reaction product on the surface from the one or more oxides and the free hydroxyl groups.

Embodiment 42. The method of embodiment 41, wherein the sol is sprayed onto the etched surface of the core in step (b).

Embodiment 43. The method of embodiment 41 or 42, wherein the hardened reaction product is formed by condensing the one or more metal oxides with an alkali hydroxide on the surface of the core.

Embodiment 44. The method of embodiment 43, wherein the alkali hydroxide is sodium hydroxide, calcium hydroxide or potassium hydroxide.

Embodiment 45. The method of embodiment 41, wherein prior to step (b) a sol of silica or silicate is applied to the surface of the core.

Embodiment 46. A method of preparing a surface modified proppant or sand control particulate having a core and a coating on at least a portion of the surface of the core, the method comprising (a) applying onto at least a portion of the surface of the core a first transition metal oxide and a sol comprising silica or sodium silicate; (b) forming a reaction product between the silica or sodium silicate with the first transition metal oxide on the surface of the core; (c) applying onto at least a portion of the surface of the core, after step (b), a second transition metal oxide and forming a complex with the first transition metal oxide and the second transition metal oxide; and (d) drying the product of step (c) and forming a hardened coating on the surface of the core.

The invention claimed is:

1. A method of hydraulic fracturing a subterranean formation penetrated by a well comprising pumping into the well a proppant and creating or enlarging a fracture within the subterranean formation, wherein the proppant is a composite comprising a core wherein at least a portion of the surface of the core is coated with a reaction product of sodium silicate and a polyacrylic acid catalyzed in the presence of calcium chloride or zinc chloride and further wherein the weight average molecular weight of the polyacrylic acid is between from about 1,000 to about 4,000.

2. The method of claim 1, wherein at least one of the following is true:
(a) the weight average molecular weight of the polyacrylic acid is from about 1,500 to about 2,500;
(b) the polyacrylic acid is a copolymer of acrylic acid and maleic acid and/or the salts thereof;
(c) the coating on the surface of the core further comprises a strengthening agent selected from the group consisting of Kevlar fibers, fly ash, sludges, slags, waste paper, rice husks, saw dust, volcanic aggregates, minerals, plant and animal remains, mineral fibers, chopped or woven fiberglass, metal wools, turnings, shavings, wollastonite, nanoclays, carbon nanotubes, carbon fibers, graphene oxide and graphite and mixtures thereof;
(d) the coating on the surface of the core further comprises a magnetic, conductive or piezoelectric additive; or
(e) the coating on the surface of the core is further modified with a surface modifying treatment agent.

3. The method of claim 1, wherein the core is sand.

4. The method of claim 1, further comprising forming a pack of the composites in the fracture and wherein the pack has a conductivity equal to or greater than 20 mdft at a pressure of about 8,000 psi.

5. The method of claim 1, wherein the polyacrylic acid is derived from subunits of (i) monomers of acrylic acid or derivatives thereof; or (ii) two or more monomeric species wherein one monomer is acrylic acid or a derivative thereof.

6. The method of claim 5, wherein the polyacrylic acid further contains a member selected from phosphate, phosphonate, phosphino, sulfate and sulfonate groups.

7. The method of claim 1, wherein the surface of the core is etched to provide free hydroxyl groups.

8. The method of claim 7, wherein the free hydroxyl groups of the coating are further crosslinked.

9. The method of claim 8, wherein the free hydroxyl groups are crosslinked with a boric acid, salt or ester thereof or a borate releasing compound.

10. The method of claim 1, wherein the reaction product coated onto at least a portion of the core is calcium silicate or zinc silicate.

11. The method of claim 1, wherein the core is selected from the group consisting of sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof.

12. The method of claim 1, wherein the surface of the composite is hydrophobic or oleophobic.

13. The method of claim 1, wherein the apparent specific gravity of the core is less than or equal to 2.45.

14. The method of claim 1, wherein the thickness of the coating of the composite is from about 2 to about 120 microns.

15. The method of claim 1, wherein the size of the composite is from about 10 to about 100 nanometers.

16. The method of claim 1, wherein the composite withstands a closure stress up to about 12,000 psi when the coating ranges from about 3 to about 20 wt. percent of the weight of the core.

17. The method of claim 1, wherein the compressive strength of the composite is between from about 34 to about 130.0 MPA.

18. A method of hydraulic fracturing a subterranean formation penetrated by well comprising pumping into the well a proppant and creating or enlarging a fracture within the subterranean formation, wherein (i) the proppant is a composite comprising a core wherein at least a portion of the surface of the core is coated with a reaction product of sodium silicate and a polyacrylic acid catalyzed in the presence of calcium chloride or zinc chloride wherein the polyacrylic acid has a weight average molecular weight between from about 1,000 to about 4,000; (ii) the core is selected from the group consisting of sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof; and (iii) the composite withstands a closure stress up to about 12,000 psi when the coating ranges from about 3 to about 20 wt. percent of the weight of the core.

19. A method of hydraulic fracturing a subterranean formation penetrated by a well comprising pumping into the well a proppant and creating or enlarging a fracture within the subterranean formation, wherein the proppant is a composite comprising a core encapsulated by a coating comprising the reaction product of sodium silicate and a polyacrylic acid catalyzed in the presence of calcium chloride or zinc chloride and further wherein the weight average molecular weight of the polyacrylic acid is between from about 1,000 to about 4,000 and the thickness of the coating is between from about 2 to about 120 microns.

20. The method of claim 19, wherein at least one of the following is true:

(a) the weight average molecular weight of the polyacrylic acid is from about 1,500 to about 2,500;

(b) the polyacrylic acid is a copolymer of acrylic acid and maleic acid and/or the salts thereof;

(c) the coating on the surface of the core further comprises a strengthening agent selected from the group consisting of Kevlar fibers, fly ash, sludges, slags, waste paper, rice husks, saw dust, volcanic aggregates, minerals, plant and animal remains, mineral fibers, chopped or woven fiberglass, metal wools, turnings, shavings, wollastonite, nanoclays, carbon nanotubes, carbon fibers, graphene oxide and graphite and mixtures thereof;

(d) the coating on the surface of the core further comprises a magnetic, conductive or piezoelectric additive; or (e) the coating on the surface of the core is further modified with a surface modifying treatment agent.

21. The method of claim 19, wherein the core is sand.

22. The method of claim 19, wherein the core is selected from the group consisting of sand, ceramic beads, glass beads, bauxite grains, sintered bauxite, sized calcium carbonate, walnut shell fragments, aluminum pellets, silica, nylon pellets, nut shells, gravel, resinous particles, alumina, minerals, polymeric particles, and combinations thereof.

23. The method of claim 19, wherein the coating encapsulating the core is hydrophobic or oleophobic.

24. The method of claim 19, wherein the coating encapsulating the core is etched to provide free hydroxyl groups.

25. The method of claim 19, wherein the reaction product encapsulating the core is calcium silicate or zinc silicate.

26. The method of claim 24, wherein the free hydroxyl groups are crosslinked.

* * * * *